United States Patent
Sawdey et al.

(10) Patent No.: US 7,512,739 B2
(45) Date of Patent: Mar. 31, 2009

(54) UPDATING A NODE-BASED CACHE LRU TREE

(75) Inventors: Aaron C. Sawdey, Cannon Falls, MN (US); Steven P. VanderWiel, Rosemount, MN (US)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 11/428,581

(22) Filed: Jul. 5, 2006

(65) Prior Publication Data

US 2008/0010415 A1    Jan. 10, 2008

(51) Int. Cl.
*G06F 12/00* (2006.01)
(52) U.S. Cl. .................. 711/136; 711/133; 711/134; 707/2; 707/3; 707/9; 710/40
(58) Field of Classification Search ............... 711/136, 711/133, 134; 707/2, 3, 9, 540; 710/40
See application file for complete search history.

(56) References Cited

U.S. PATENT DOCUMENTS

| 5,715,427 | A | * | 2/1998 | Barrera et al. ............... 711/136 |
| 6,529,897 | B1 | * | 3/2003 | Corl et al. ...................... 707/2 |
| 6,789,153 | B1 | * | 9/2004 | Stewart ...................... 710/306 |
| 2005/0055506 | A1 | * | 3/2005 | DeMent et al. ............. 711/133 |

OTHER PUBLICATIONS

Kharbutli, Mazen, et al, "Eliminating Conflict Misses Using Prime Number-Base Cache Indexing", IEEE Transactions on Computers, vol. 54, No. 5, May 2005, pp. 573-586.
Milenkovic, Aleksandar, et al, "A Performance Evaluation of Memory Hierarchy in Embedded Systems", 2003 IEEE.

* cited by examiner

*Primary Examiner*—Hong Kim
(74) *Attorney, Agent, or Firm*—Cantor Colburn LLP

(57) ABSTRACT

Exemplary embodiments include a method for updating an Cache LRU tree including: receiving a new cache line; traversing the Cache LRU tree, the Cache LRU tree including a plurality of nodes; biasing a selection the victim line toward those lines with relatively low priorities from the plurality of lines; and replacing a cache line with a relatively low priority with the new cache line.

5 Claims, 3 Drawing Sheets

US 7,512,739 B2

UPDATING A NODE-BASED CACHE LRU TREE

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

The present invention relates to the field of memory caches. More specifically, the present invention relates to a method for updating an Cache LRU tree.

2. Description of Background

Cache memories, in which a Central Processing Unit (CPU) stores its most recently used data, are a fixture in modern computer designs. Since not all data currently in use by the CPU can fit within a cache's limited storage capacity, an algorithm must be established to decide which pieces of data are to be displaced when new data arrives in the cache. The most common cache management algorithm is the Least Recently Used (LRU) algorithm. In the LRU approach, the data that has been in the cache for the longest period of time without being used by the CPU are favored for replacement when space is needed in the cache memory.

One shortcoming of the LRU algorithm is that it focuses on a single characteristic of the data stored in the cache memory, namely, the relative length of time lines have remained unreferenced in the set. What is needed is an algorithm that can factor in a generic priority associated with a line. The initial priority of a line is determined external to the cache and is provided to the cache when the line enters the cache

SUMMARY OF THE INVENTION

Exemplary embodiments include a method for updating a Cache LRU tree including: receiving a new cache line; traversing the Cache LRU tree, the Cache LRU tree including a plurality of nodes; biasing the selection of a victim line toward those lines with relatively low priorities from the plurality of lines indexed by the LRU tree; and replacing a cache line with a relatively low priority with the new cache line.

Exemplary embodiments also include a method for updating a Cache LRU tree including: receiving a new cache line in the LRU tree, the Cache LRU tree including a plurality of nodes; determining a binary value of a current LRU tree node;; incrementing a tree level variable; inverting the binary value of the current node responsive to the priority level of the new cache line; updating a next node pointer responsive to the binary value of the current node; setting the current node to the next node pointer; selecting a line with a relatively low priority from the plurality of lines; and replacing a cache line corresponding with the a relatively low priority with the new cache line.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution, which determines which cache lines to displace when the cache memory is full.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
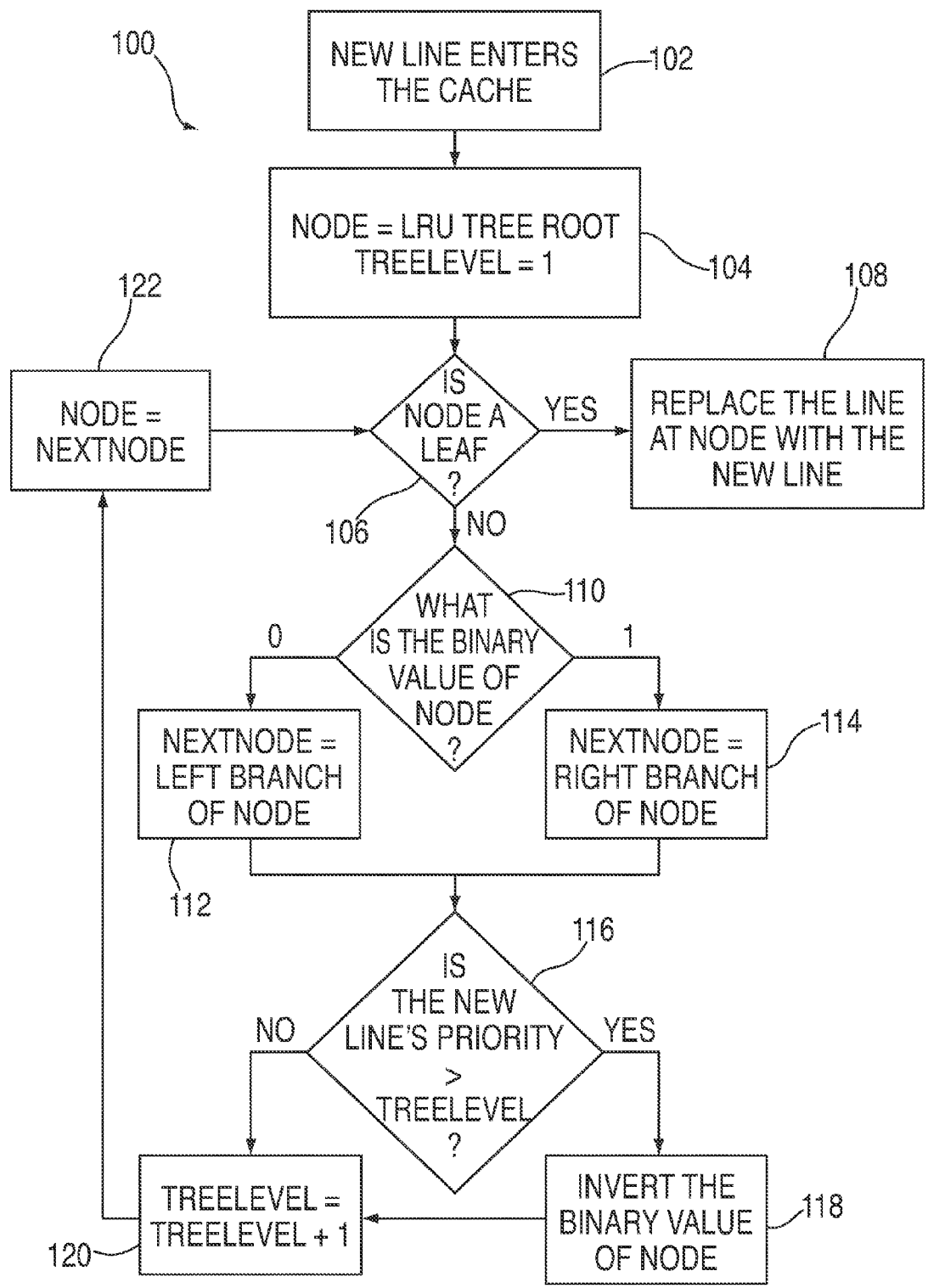
FIG. 1 illustrates a flow chart for a method for updating an LRU tree in accordance with exemplary embodiments.

The detailed description explains the preferred embodiments of the invention, together with advantages and features, by way of example with reference to the drawings.

DETAILED DESCRIPTION OF THE INVENTION

The present invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention in detail. The examples used herein are intended merely to facilitate an understanding of ways in which the invention may be practiced and to further enable those of skill in the art to practice the invention. Accordingly, the examples should not be construed as limiting the scope of the invention.

Cache memories are organized into associativity sets. There are typically hundreds or thousands of the associativity sets in a cache and each set holds a fixed number of data units, called "lines." Cache lines in contemporary designs range in size from 32 to 256 bytes. The numbers of lines held in a set is termed the associativity of that set so that, for example, a cache with sets made up of 8 lines is said have an "associativity of 8" or to be "8-way associative".

When new lines are brought into a cache, the address of the line is used to establish into which set that line will be placed. The chosen set must then replace one of the lines currently stored in the set to make room for the new line. The method by which the replaced (victim) line is chosen is called the cache replacement policy. As mentioned above, the LRU replacement policy is almost universally accepted as the policy of choice for computer systems.

Figure 3:
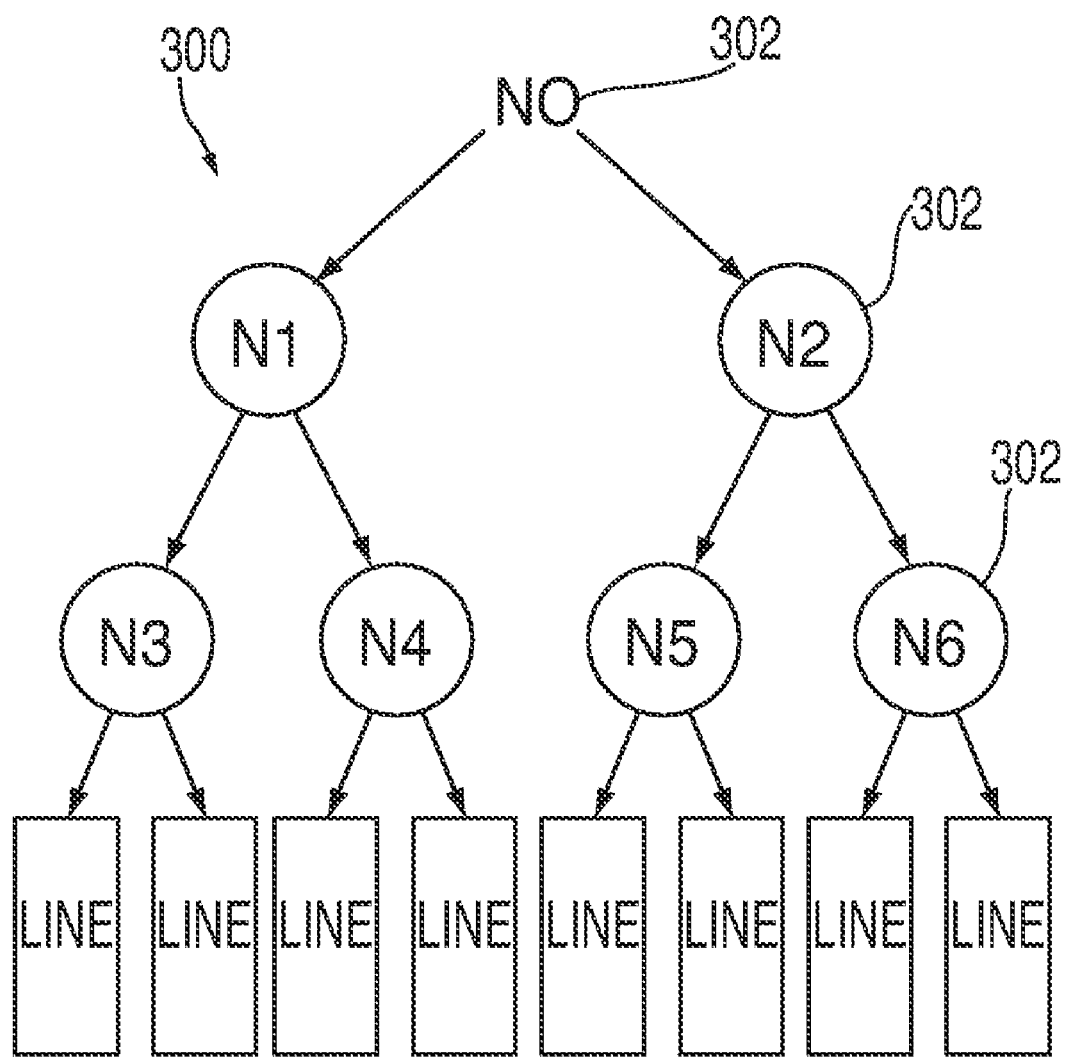
FIG. 3 illustrates a least recently used hierarchical tree structure in accordance with exemplary embodiments.

Several techniques exist for implementing an LRU cache management policy; one popular technique is known as the "tree-base pseudo LRU." In the tree-based pseudo LRU approach, the cache lines stored in a set are conceptually made the leaves of a hierarchical tree structure as referred to generally in FIG. 3 as 300. In FIG. 3, the nodes 302 of the tree 300 are labeled Ni where i is in range of 0 to the number of lines per set minus one. Each of these nodes 302 holds a single bit of state information to indicate whether the node points to the left or right. The tree 300 is maintained in such a way that following these pointers from the root of the tree (N0) will lead to the least recently used line in the set. In exemplary embodiments, an advanced method for the management of the tree takes into consideration the priority of the line being placed in the tree in such a way that lower priority lines are more likely to be chosen for replacement than higher priority lines.

The algorithm used to maintain the LRU tree described above is simple. When a line is placed in a cache set, it is placed in the position pointed to by the tree, starting at the root node. Then, the same nodes traversed to arrive at this new position are inverted. That is, a binary 0 is changed to a binary 1 and visa versa. For example, assume that the LRU tree is initialized such that all the pointers point to the right and that a right pointer is represented as a binary "1" and a left pointer is represented as a binary "0". Then the initial LRU tree is digitally represented by the 7-bit word: 1111111. When a line is placed in the cache set, following the pointers from the root node would lead the cache to place the new line in the 7th slot. The tree nodes traversed in this process are then set to point in the opposite direction. That is, the binary values of N0, N2 and N6 are inverted such that the tree is now represented as 0101110. When the next line is inserted, the tree would point to the 3rd slot and nodes N0, N1 and N4 would be inverted such that the line is represented as 1001010. A similar procedure is followed when lines are read or written by the CPU (called a "cache hit"). Once the line is found in the cache, the nodes leading from the line's leaf position to the root, including the root, are inverted.

In exemplary embodiments, a priority may be attached to a line as it enters the cache, which is then factored into the replacement decision. For example, those lines with lower priority are more likely to be displaced from the cache than those with a higher priority. However, LRU information is also used in the decision process to prevent high priority lines from establishing an unduly long occupancy in the cache. The initial priority of a line is determined as it enters the cache. Once in the cache, the priority of the line determines which bits of the LRU tree are affected during the initial placement of the line and after a hit to the line. In additional exemplary embodiments, a change in a line's priority may be based on the number of hits to the line.

Referring now to FIG. 1, a flow chart for a method 100 for updating an LRU tree in accordance with exemplary embodiments is illustrated. The method 100 begins with a new line entering the cache, as shown at method step 102. Once a new line enters the cache, a node variable is set to the root node and a tree level variable is set to 1, as shown at method step 104. Next, the node variable is checked to determine if the node is a leaf node, as shown at method step 106. If the node is a leaf node the method 100 proceeds to method step 108 and replaces the existing cache line at the node with the new cache line. Otherwise, the method 100 proceeds to method step 110 and checks the binary value of the node. If the binary value of the node is 0 then the LRU tree is traversed by moving to the left branch of the node, as shown at method step 112. Otherwise, then the LRU tree is traversed by moving to the right branch of the node, as shown at method step 114. After traversing the LRU tree, the method 100 checks the priority of the new cache line to determine if it is greater than or equal to the tree level variable, as shown at method step 116. If the priority of the new cache line is greater than or equal to the tree level variable, then the binary values of the node is inverted, as shown at method step 118, and the method 100 proceeds to method step 120. Additionally, if the priority of the new cache line is not greater than or equal to the tree level variable the method 100 also proceeds to method step 120. At method step 120, the tree level variable is incremented and the method 100 then proceeds to method step 122. At method step 122, the node variable is set to the next node and the method 100 iterates by returning to method step 106.

Figure 2:
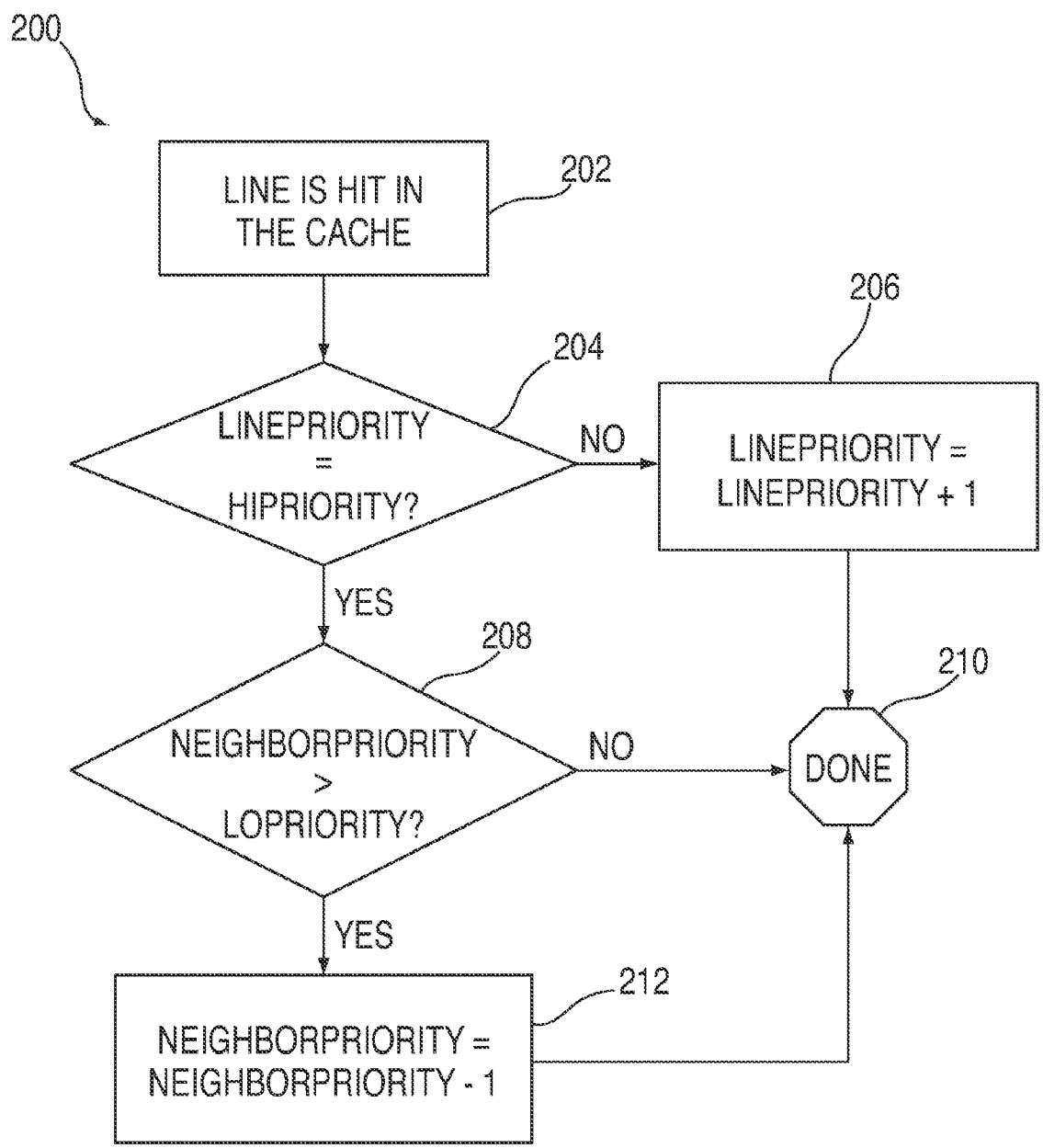
FIG. 2 illustrates a flow chart for a method for updating the priority of a cache line in accordance with exemplary embodiments.

Turning now to FIG. 2, a flow chart for a method 200 for updating the priority of a cache line in accordance with exemplary embodiments is illustrated. The first step in the method 200 is to receive a cache line hit, as shown at method step 202. At method step 204, the method 200 determines if the cache line priority is equal to the high priority and if so the method 200 proceeds to method step 208. Otherwise, the method proceeds to method step 206 where the cache line priority is incremented and the method terminates at method step 210. At method step 208, the method determines if the priority of a neighbor cache line, cache lines that are leaves of a common LRU tree node are neighbors, is greater that the low priority and if so the process proceeds to method step 212; otherwise the method terminates at method step 210. Finally, at method step 212 the method 212 decrements the priority of the neighbor cache line and the method 200 then terminates at method step 210.

In one embodiment, assume that there are 8 member sets and further that a cache line can take on one of 4 possible priorities with 0 being the lowest (least likely to result in a cache hit) and 3 the highest (most likely to result in a cache hit). This priority is used to indicate which levels of the tree hierarchy are inverted upon placement in the cache and during subsequent hits to the line. In this way, the proposed scheme uses a line's priority to control the extent to which the line can point away from itself. In this embodiment, a priority of 0 indicates that no LRU bits are updated upon line insertion or a hit. A priority of 1 indicates that the LRU bit representing the 1st level of the tree (N0 in the example tree) is inverted. A priority of 2 indicates that one bit in level 1 and one bit in level 2 are inverted (N0-N3, in the example tree). A priority of 3 indicates that one bit in each of levels 1, 2 and 3 will be inverted (all the levels the exemplary tree depicted in FIG. 3).

To prevent a cache line that was given an initial low priority from being replaced when it is later found to be useful to the CPU, the priority of the line may be incremented when a line is hit in the cache. Once the line achieves (or has already exceeded) the high threshold priority, its priority does not increase further. The high threshold priority is the highest priority the cache is allowed assign to a line although it is not necessarily the same thing as the highest possible priority, which can be assigned to a line external to the cache. Instead, the line that is attached to the same node may have its priority reduced to the low threshold priority if its priority is higher than the low threshold. The low threshold priority is the lowest priority the cache is allowed assign to a line, it is not necessarily the same thing as the lowest possible priority, which can be assigned to a line external to the cache. The high and low thresholds can be adjusted to suit the design but, by definition, 0 is less than or equal to the low threshold, which is less than or equal to the high threshold. The high threshold is less than or equal to the maximum priority. For example, if one wished to implement the cache such that only increasing priorities are possible, the low priority and high priority would both be equal to the maximum priority. Alternatively, one could establish a "normal" priority between the maximum and minimum priorities by setting both the high and low thresholds to this midpoint.

Neither the method 100 nor the method 200 changes the representation of the LRU tree 300 but they do require additional storage to record the priority of each line in a set. In general, there will need to be $M*\log_2(P)$ bits allocated for this purpose per set, where M is the set associativity of the cache and P is the smallest power of two that is equal to or greater than the number priorities to be supported.

Variations of the methods 100 and 200 are possible and may prove useful for particular implementations. Although it is not possible to have more than $\log_2(M)+1$ priority levels, it is possible to have fewer levels. In all cases, lines with the highest priority should update one bit in each LRU tree level but the designer must chose which subset of the LRU tree levels is to be affected when a line with a lower priority line is involved. Also, an alternate implementation may not update the priority of a line when it is hit in the cache. In yet another exemplary embodiment, at the expense of some additional logic, we can refine the method 100 of updating the LRU tree to be based purely on the priorities of the lines.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for updating a Cache least recently used (LRU) tree comprising:
   receiving a new cache line;
   traversing the Cache LRU tree, wherein the Cache LRU tree includes a plurality of nodes by determining a binary value of a current node, checking a priority level of the new cache line, inverting the binary value of the current node responsive to the priority level of the new cache line, updating a next node pointer responsive to the binary value of the current node, and setting the current node to the next node pointer;
   biasing a selection of a victim line towards those lines with relatively low priorities from the plurality of lines indexed by the LRU tree; and
   replacing a cache line with a relatively low priority with the new cache line.

2. The method of claim 1, wherein the priority level is selected from at least one of the following:
   zero;
   one;
   two; or
   three.

3. The method of claim 2, wherein the priority level of zero is indicative of that a line is more likely to be replaced and therefore unlikely to result in a future cache hit.

4. The method of claim 3, wherein the priority level of three is indicative that the line will remain in the cache for a longer time and therefore more likely to result in a future cache hit.

5. A method for updating an Cache least recently used (LRU) tree comprising:
   receiving a new cache line in the LRU tree, the Cache LRU tree including a plurality of nodes;
   determining a binary value of a current node;
   determining a priority level of the new cache line;
   incrementing a tree level variable;
   inverting the binary value of the current node responsive to the priority level of the new cache line;
   updating a next node pointer responsive to the binary value of the current node;
   setting the current node to the next node pointer;
   selecting a line with a relatively low priority from the plurality of lines; and
   replacing a cache line with a relatively low priority with the new cache line.

* * * * *